United States Patent
Zhou

(10) Patent No.: US 9,210,317 B2
(45) Date of Patent: *Dec. 8, 2015

(54) FOCUS POSITION ESTIMATION

(71) Applicant: Apple Inc., Cupertino, CA (US)

(72) Inventor: Jianping Zhou, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,789

(22) Filed: Jul. 14, 2014

(65) Prior Publication Data

US 2014/0320731 A1   Oct. 30, 2014

Related U.S. Application Data

(63) Continuation of application No. 13/327,335, filed on Dec. 15, 2011, now Pat. No. 8,803,987.

(51) Int. Cl.
*H04N 5/232* (2006.01)
*G03B 3/10* (2006.01)
*G02B 7/08* (2006.01)
*G02B 27/64* (2006.01)

(52) U.S. Cl.
CPC .............. *H04N 5/23212* (2013.01); *G02B 7/08* (2013.01); *G02B 27/64* (2013.01); *G03B 3/10* (2013.01); *H04N 5/23258* (2013.01)

(58) Field of Classification Search
CPC ............................. H04N 5/228; H04N 5/23212
USPC ....................................................... 348/208.99
See application file for complete search history.

(56) References Cited

U.S. PATENT DOCUMENTS

| | | | |
|---|---|---|---|
| 6,047,133 A | 4/2000 | Washisu et al. | |
| 7,623,774 B2 | 11/2009 | Rukes | |
| 7,634,178 B2 | 12/2009 | Washisu | |
| 7,936,144 B2 | 5/2011 | Vig et al. | |
| 8,803,987 B2 * | 8/2014 | Zhou | 348/208.99 |
| 2009/0154911 A1 * | 6/2009 | Shibata | 396/55 |
| 2001/0221952 | 9/2011 | Hamada et al. | |
| 2012/0257065 A1 * | 10/2012 | Velarde et al. | 348/175 |

* cited by examiner

Primary Examiner — James Hannett
(74) Attorney, Agent, or Firm — Kenyon & Kenyon LLP

(57) ABSTRACT

A method for lens position estimation can include receiving from a lens driver a drive current value representing a current to be provided to a motor to position a camera lens of an electronic device, detecting an orientation of the electronic device using a motion sensor, determining a gravity vector based upon the orientation, and computing an estimated value of a lens position of the camera lens of the electronic device based upon the drive current value and gravity vector.

25 Claims, 7 Drawing Sheets

300

400

500

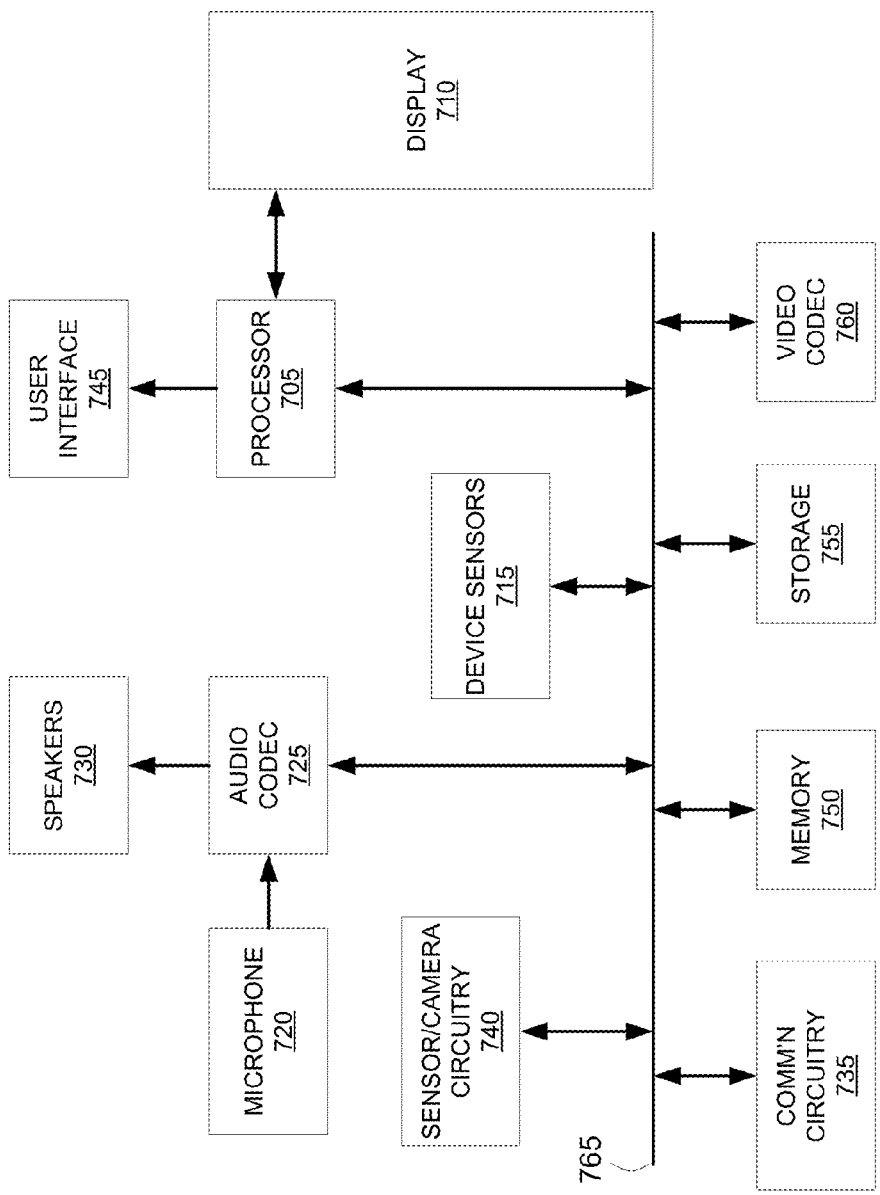

FOCUS POSITION ESTIMATION

CROSS REFERENCE TO RELATED APPLICATION

The present application is a continuation of, and claims priority to, U.S. patent application Ser. No. 13/327,335, filed on Dec. 15, 2011, which is herein incorporated by reference in its entirety.

BACKGROUND

The present invention relates to estimating the focus position of a camera lens within an electronic device.

Many electronic devices include cameras with focus capabilities. An electronic device including a camera may include manual focus, auto-focus, or both. Exemplary electronic devices include, but are not limited to, mobile telephones, personal digital assistants, portable music players, portable video players, and portable computer systems such as laptops, notebooks and tablet computers. During a manual focus or auto-focus operation, a lens driver in the camera adjusts the focus position of the camera lens, which is the distance between the center of the camera lens and the sensor imaging plane. The focus position of a camera lens may be used by applications, such as within imaging or computer vision applications. The focus position can be used within these applications to determine geometric information, such as the distance of an object from the camera, for example.

During a focus operation, the focus position of the camera lens is adjusted using a lens driver, which is powered using a drive current. The value of the drive current can be used to estimate the focus position. However, estimating the focus position based solely upon a measured drive current can lead to inaccurate results due to variables, such as the orientation of the electronic device. Thus, a need exists for an improved technique of accurately estimating a focus position for a camera lens.

BRIEF DESCRIPTION OF THE DRAWINGS

FIG. 7 is a simplified functional block diagram of an electronic device incorporating a lens position estimation system according to an embodiment of the present invention.

DETAILED DESCRIPTION

Embodiments of the present invention provide techniques for estimating the focus position of a camera lens. A drive current value may be received from a lens driver. An orientation of an electronic device may be detected using a motion sensor. A gravity vector based upon the orientation may then be determined. A drive current offset may be determined based upon the gravity vector. The drive current value may be combined with the calculated drive current offset to create a normalized drive current. A lens position value associated with a camera lens of the electronic device may be computed based upon the normalized drive current.

Figure 1:
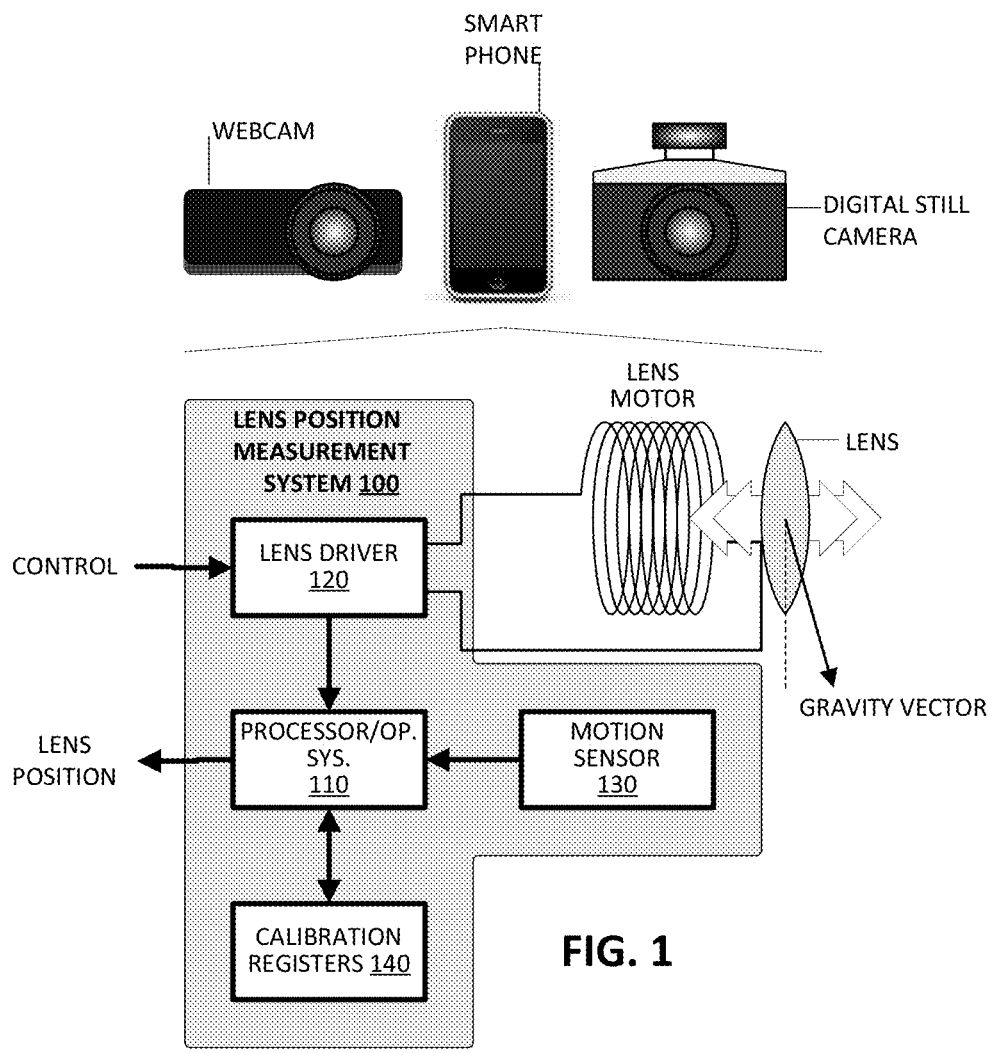
FIG. 1 is a simplified block diagram of a lens position estimation system according to an embodiment of the present invention.

FIG. 1 is a simplified block diagram of a lens position measurement system according to an embodiment of the present invention. The system 100 may find application in a variety of camera-enabled electronic devices including, for example, digital still cameras, camcorders, camera enabled phones, webcams and security cameras. The system 100 may include a processor 110, a lens driver 120, a motion sensor 130 and calibration memory 140. The lens driver 120 may generate a drive signal to a lens motor in response to a control signal applied to it. Typically, the control signal may be generated from an auto-focus system (not shown) provided within a camera system. The drive signal may be provided as a current to the lens motor. In an alternative embodiment, the drive signal may be provided as a voltage to the lens motor. The lens driver 120 may output data to a processor representing the magnitude of the drive current.

The motion sensor 130 may output data representing an orientation of the system 100. The processor 110 may derive a gravity vector from the motion sensor data representing the lens's orientation in space. The motion sensor 130 may be provided as a accelerometer, a gyroscope, or a compass. In an embodiment, a gravity vector is derived from an accelerometer using a low-pass filter of motion sensor data. The calibration memory 140 may store data representing drive current calibration factors based on the lens's orientation in space.

The processor 110 represents processing capability of the system 100 to derive a lens position based on drive current data output by the lens driver 120 and motion sensor data 130. The processor 110 may determine a gravity vector, or value, based upon motion sensor data 130. For example, gravitational pull affecting the lens driver may change based upon the orientation of the device. The effect of gravity may influence the drive current value received by the processor 110 from the lens driver. The processor 110 may use a gravity vector to determine a drive current offset, which may be positive or negative. The processor 110 may combine the drive current offset with the drive current data to calculate a normalized drive current. In an embodiment, the processor 110 may calculate a lens position value associated with a camera lens of an electronic device based upon the normalized drive current.

The processor 110 may be embodied by a central processing unit of the electronic device in which the camera system is provided. Alternatively, the processor 110 may be embodied by processing logic within an integrated circuit of the device, for example, an integrated circuit that includes the lens driver 120. In either embodiment, the system 100 may output data representing the lens's position to other components within the device, such as an operating system or applications (not shown) within the device. In an embodiment, lens position data may be output to one or more applications within the device via an application programming interface (API). An API may be one or more software abstraction layers that allow high-level applications to interface with software and hardware. Examples of software may be operating systems, firmware, web applications or standalone software products. Examples of hardware may be central processing units, modems, Wi-Fi cards, global positioning systems or display screens.

In an embodiment, the lens position may be output to components within the device to perform various functions. In an embodiment, the lens position may be used to calculate the distance between an electronic device and an object. The distance (d) may be calculated using a lens position (p) and a focal length (f) using the following equation: $1/d=(1/f)-(1/p)$. In an embodiment, the lens position may be used by one or more imaging applications, such as a video application. A video application may use lens position information for functions, such as video stabilization.

Figure 2:
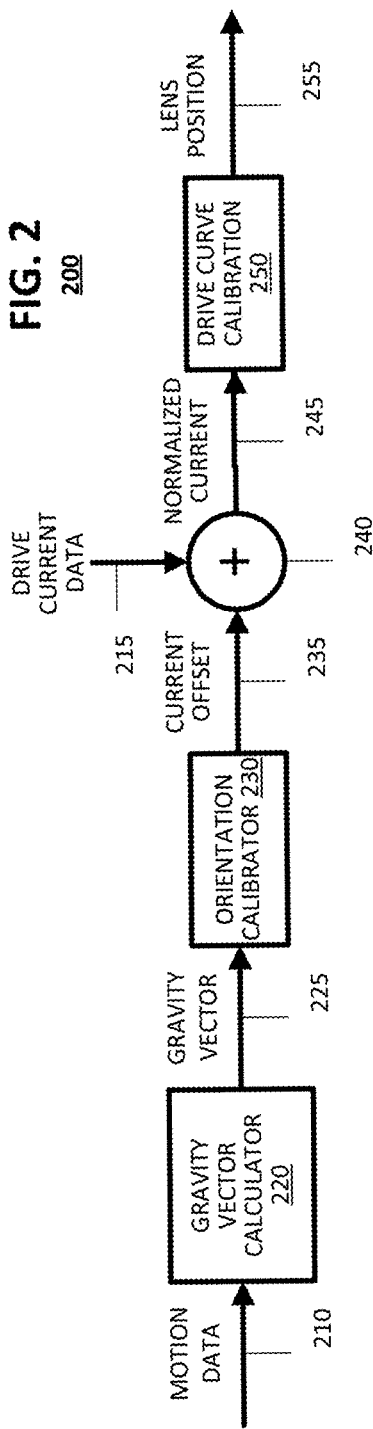
FIG. 2 is a data flow diagram of a lens position estimation system according to an embodiment of the present invention.

FIG. 2 is a data flow diagram 200 illustrating operation of a lens estimation system according to an embodiment of the present invention. Motion data 210 from a motion sensor may be input to the system and processed by a gravity vector calculator 220 into a gravity vector 225. The gravity vector 225 may represent the lens's orientation in free space. An orientation calibrator 230 may derive a current offset 235 from the gravity vector 225. The current offset 235 may represent an offset value, which may be positive or negative, to be applied to an actual drive current value 215 to generate a normalized current value 245. Adder 240 represents addition of the drive current data value 215 and the current offset value 235.

The normalized current value 245 may be input to a drive curve calibrator 250. The drive curve calibrator may output a value 255 representing a position of the camera lens based on the normalized current value 245.

In practice, the orientation calibrator 230 may be implemented as a look up table that stores offset values for the camera and is indexed by gravity vector values. The look up table may store offset values derived from a predetermined calibration operation representing changes in offset current required at each orientation to drive a lens to a predetermined position within its field of displacement. Each orientation would be matched to a predetermined gravity vector. During operation, when a gravity vector is input to the orientation calibrator 230, an offset may be read from the look up table corresponding to an entry with a closest-matching gravity vector. Alternatively, when an input gravity vector does not match exactly an index value to the look up table, an offset value may be interpolated from two or more matching indices.

Similarly, in practice the drive curve calibrator 250 may be implemented as a look up table that stores lens positions for the camera indexed by current values. The look up table may store data representing a lens's position at various drive current values. Typically, the lens position data is obtained during a calibration operation in which various drive current values are applied to a lens and the lens position is measured. Alternatively, the calibration operation may be performed to cause a lens system to focus on a given object at various distances from a camera. which requires the auto-focus system to move the lens to a variety of focus positions corresponding to the object distances. The drive current may be measured at each of the lens positions and stored in the look up table.

During the calibration operation, the lens's orientation with respect to gravity may be maintained at a predetermined position. By way of example, the lens may be set to face up in a horizontal position. At this position, gravitational pull on the lens may require additional drive current to drive the lens to a predetermined position than when no gravitational pull is present, as the driver is working against gravity. A lens set to face down in a horizontal position often requires less drive current to drive the lens to a predetermined position than when no gravitational pull is present, as the driver is working with gravity.

Figure 3:
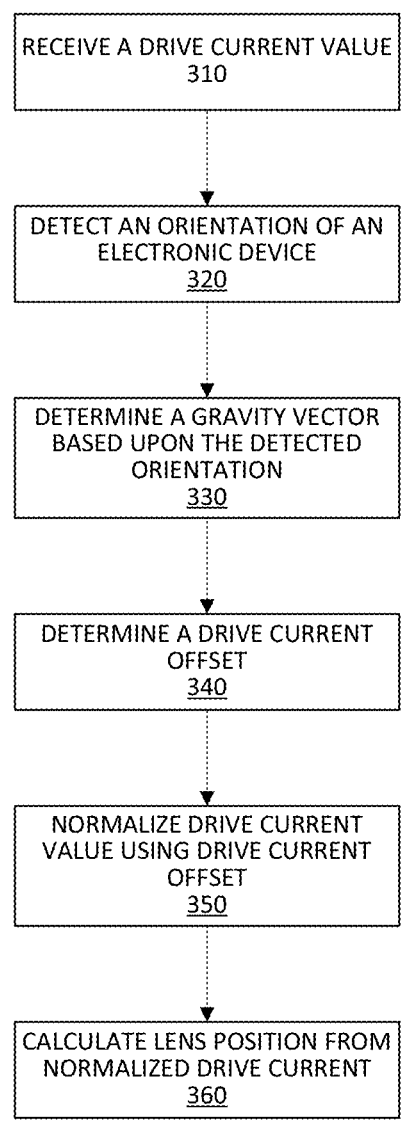
FIG. 3 illustrates a logic flow for lens position estimation according to an embodiment of the present invention.

FIG. 3 illustrates a logic flow 300 for lens position estimation according to an embodiment of the present invention. At step 310, a drive current value may be received by a processor. The drive current value may represent a drive current used to drive a camera lens into a focus position during a manual or auto-focus operation.

At step 320, a motion sensor may detect an orientation of an electronic device. The orientation of the electronic device may be detected using one or multiple motion sensors, which may include an accelerometer, gyroscope, or a compass. In the case of an accelerometer, the orientation of the electronic device may be derived using a low-pass filter of the accelerometer.

At step 330, a gravity vector may be determined based upon the detected orientation. The gravity vector may represent a value associated with the gravitational pull experienced by the lens driver at a particular detected orientation. In the case of an accelerometer, the gravity vector of the electronic device may be derived using a low-pass filter of the accelerometer output along the z-axis. In another embodiment, the gravity vector may be determined using a predetermined look up table that stores gravity vectors for the camera indexed by camera orientation values. Each orientation may be matched to a predetermined gravity vector.

At step 340, a drive current offset may be determined. The drive current offset may represent a value used to compensate for the gravitational pull experienced by a lens driver at a particular orientation. During operation, when a gravity vector is determined, an offset may be read from a predetermined look up table corresponding to an entry with a closest-matching gravity vector. Alternatively, when an input gravity vector does not match exactly an index value to the look up table, an offset value may be interpolated from two or more matching indices.

At step 350, a normalized drive current may be calculated using the drive current value from step 310 and the drive current offset determined in step 340. The drive current offset may be a positive or negative value, thus, combining the drive current offset with the drive current value may result in an increased or decreased normalized drive current.

At step 360, a lens position may be calculated using the normalized drive current. In practice, the lens position may be calculated from a predetermined look up table that stores lens positions for the camera indexed by current values. The look up table may store data representing a lens's position at various drive current values. Typically, the lens position data is obtained during a calibration operation in which various drive current values are applied to a lens and the lens position is measured. Alternatively, the calibration operation may be performed to cause a lens system to focus on a given object at various distances from a camera, which requires the auto-focus system to move the lens to a variety of focus positions corresponding to the object distances. The drive current may be measured at each of the lens positions and stored in the look up table.

Once calculated, the lens position may be utilized by hardware within an electronic device, or one or more software applications within an electronic device. In an embodiment, the lens position may be used to calculate the distance between an electronic device and an object. The distance (d) may be calculated using the focus position (p) and the focal length (f) using the following equation: $1/d=(1/f)-(1/p)$. In an embodiment, the lens position may be used by one or more imaging applications, such as a video application. A video application may use lens position information for functions, such as video stabilization.

Figure 4:
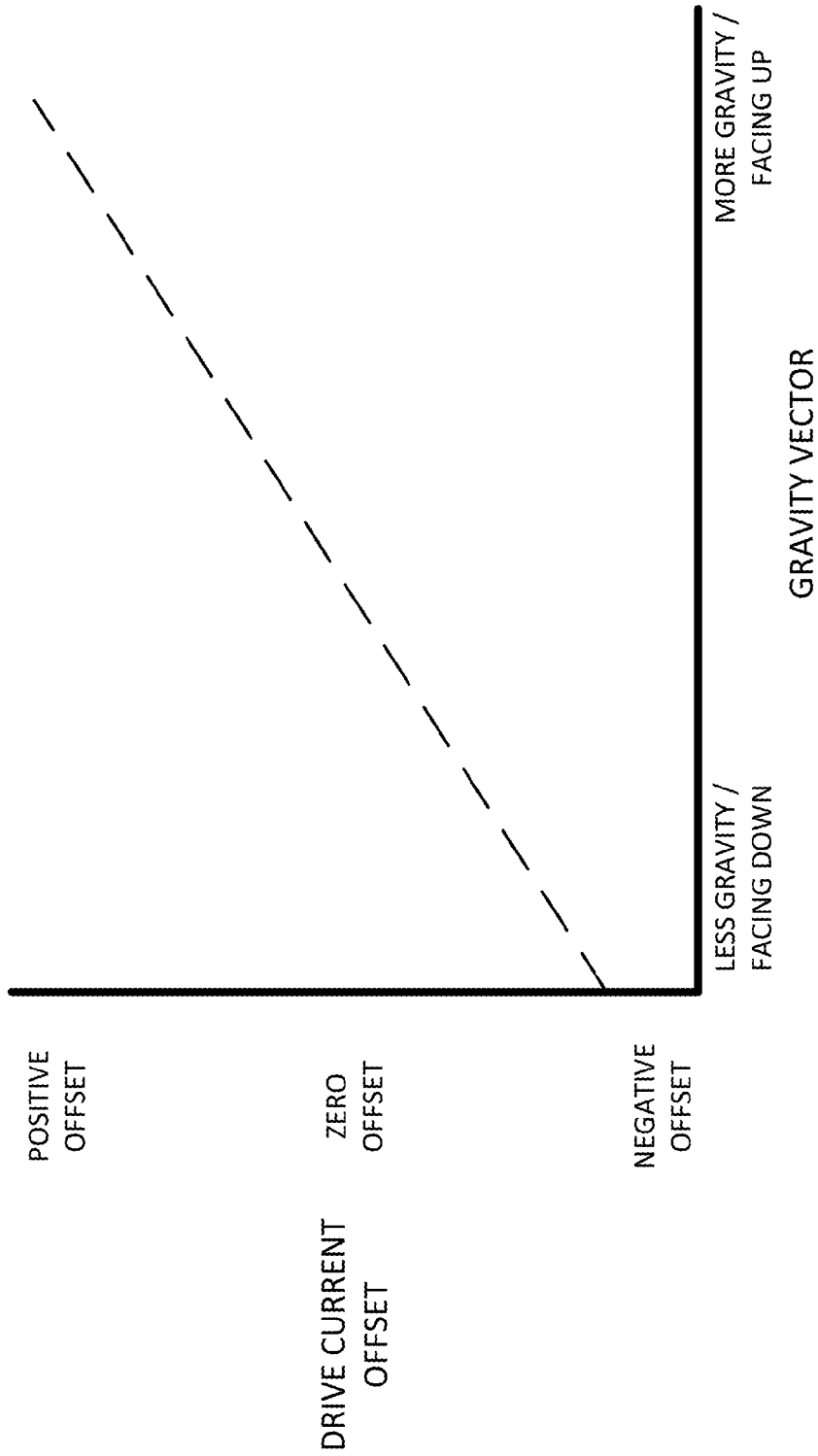
FIG. 4 is a graph illustrating the relationship between a gravity vector and a drive current offset according to an embodiment of the present invention.

FIG. 4 is a graph 400 illustrating a gravity vector as it relates to a drive current offset according to an embodiment of the present invention. As illustrated within FIG. 4, when an electronic device is oriented with the lens facing down, gravitational pull may be weaker and a negative drive current offset may be applied. As the lens becomes oriented towards the up position, the lens driver may begin to work against gravity, thus, the gravitational pull increases along with the drive current offset. The graph 400 illustrated within FIG. 4 may represent the opposite values stored within a predetermined look up table that stores offset values for the camera to normalize (or compensate) orientation variation and is indexed by gravity vector values. The look up table may be developed using a simulation of a mechanical lens system or testing of an exemplary system using a series of calibrated tests.

Figure 5:
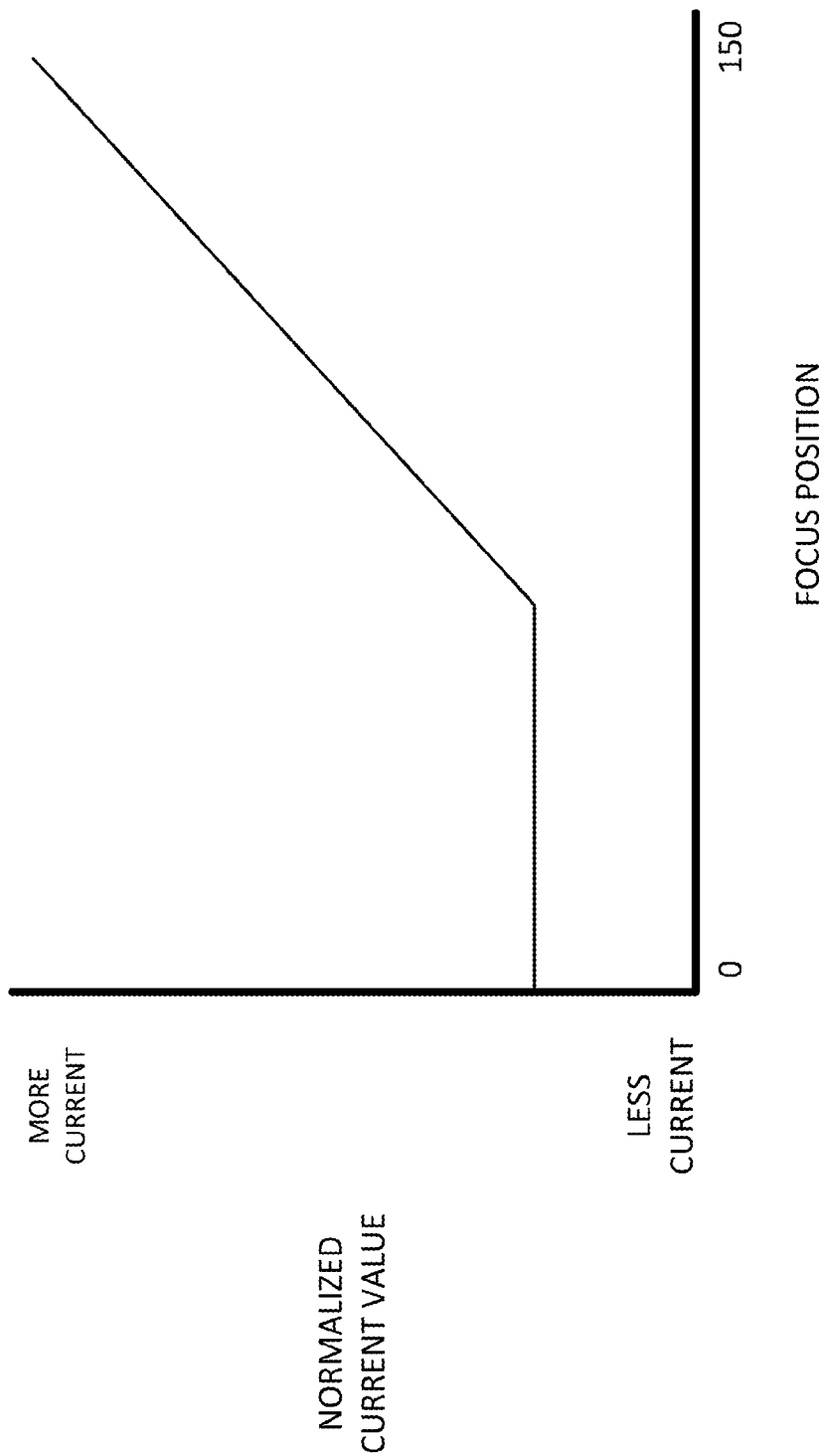
FIG. 5 is a graph illustrating the relationship between a normalized current value and focus position according to an embodiment of the present invention.

FIG. 5 is a graph 500 illustrating the relationship between a normalized current value and focus position according to an embodiment of the present invention. As illustrated within FIG. 5, an increase in normalized current represents an increase in the focus position. The graph 500 illustrated within FIG. 5 may represent a look up table that stores data representing a lens's position at various drive current values. The look up table may be developed using a simulation of a mechanical lens system or testing of an exemplary system using a series of calibrated tests. The calibrated tests may detect and measure lens movement and position at different drive currents. A look up table representing the graph 500 illustrated within FIG. 5 may be merged with the look up table representing the graph 400 illustrated within FIG. 4 to form a single look up table.

Figure 6:
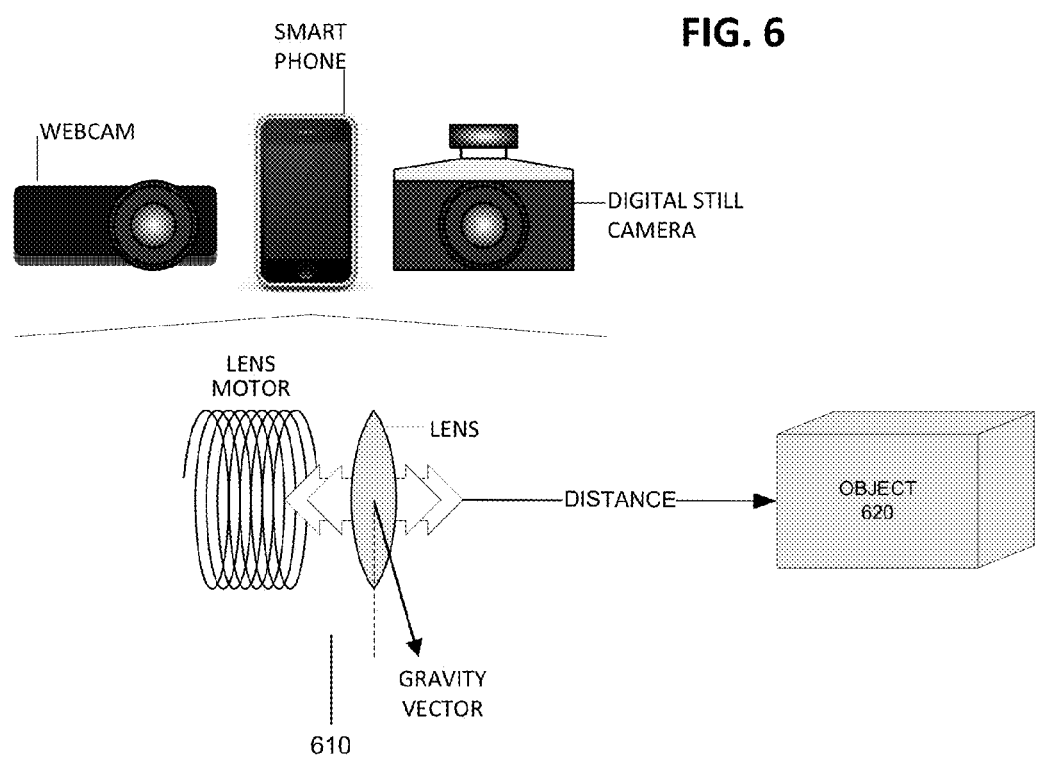
FIG. 6 is a simplified block diagram of a lens position estimation system according to an embodiment of the present invention.

FIG. 6 is a simplified block diagram of a lens position estimation system according to an embodiment of the present invention. Once computed, a lens position value may be output to components within the device to perform various functions. In an embodiment, the lens position may be used to calculate the distance between an electronic device, such as an electronic device containing lens system 610, and an object 620. Object 620 may be an object focused upon, using manual or auto-focus techniques, by lens system 610. The distance (d) may be calculated using the focus position (p) and the focal length (f) using the following equation: $1/d=(1/f)-(1/p)$. In an embodiment, the lens position may be used by one or more imaging applications, such as a video application. A video application may use lens position information for functions, such as video stabilization.

FIG. 7 is a simplified functional block diagram of representative electronic device 700 incorporating a lens position estimation system is shown according to an embodiment. Electronic device 700 may include processor 705, display 710, device sensors 715 (e.g., gyro, accelerometer, proximity, compass, and ambient light sensors), microphone 720, audio codec 725, speaker 730, communications circuitry 735, image sensor with associated camera and video hardware 740, user interface 745, memory 750, storage device 755, video codec(s) 760 and communications bus 765.

Processor 705 may be any suitable programmable control device or general or special purpose processor or integrated circuit and may execute instructions necessary to carry out or control the operation of many functions, such as the generation and/or processing of image metadata, as well as other functions performed by electronic device 700. Processor 705 may for instance drive display 710 and may receive user input from user interface 745. Processor 705 may also, for example, be a system-on-chip such as an application's processor such as those found in mobile devices or a dedicated graphics processing unit (GPU). Processor 705 may be based on reduced instruction-set computer (RISC) or complex instruction-set computer (CISC) architectures or any other suitable architecture and may include one or more processing cores.

Memory 750 may include one or more different types of storage media used by processor 705 to perform device functions. Memory 750 may include, for example, cache, read-only memory (ROM), and/or random access memory (RAM). Communications bus 760 may provide a data transfer path for transferring data to, from, or between at least storage device 755, memory 750, processor 705, and camera circuitry 740. User interface 745 may allow a user to interact with electronic device 700. For example, user interface 745 can take a variety of forms, such as a button, keypad, dial, a click wheel, or a touch screen.

Non-transitory storage device 755 may store media (e.g., image and video files), computer program instructions or software, preference information, device profile information, and any other suitable data. Storage device 755 may include one more storage mediums including, for example, magnetic disks (fixed, floppy, and removable) and tape, optical media such as CD-ROMs and digital video disks (DVDs), and semiconductor memory devices such as Electrically Programmable Read Only Memory (EPROM), and Electrically Erasable Programmable Read-Only Memory (EEPROM).

Video codec 760 may be a hardware device, a software module or a combination of hardware and software that enables video compression and/or decompression of digital video. For example, video codec 760 may implement the H.264 video standard. Communications bus 765 may be any one or more communication paths and employ any technology or combination thereof that is appropriate for the particular implementation.

Software may be organized into one or more modules and be written in any suitable computer programming language (or more than one language). When executed by, for example, processor 705 such computer program code or software may implement one or more of the methods described herein.

Various changes in the materials, components, circuit elements, as well as in the details of the illustrated operational methods are possible without departing from the scope of the following claims. For instance, processor 705 may be implemented using two or more program control devices communicatively coupled. Each program control device may include the above-cited processors, special purpose processors or custom designed state machines that may be embodied in a hardware device such as an application specific integrated circuit (ASIC) or a field programmable gate array (FPGA).

In the above description, for purposes of explanation, numerous specific details have been set forth in order to provide a thorough understanding of the inventive concepts. As part of the this description, some structures and devices may have been shown in block diagram form in order to avoid obscuring the invention. Reference in the specification to "one embodiment" or "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the lens position estimation and digital imagery field having the benefit of this disclosure.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

I claim:

1. A method for lens position estimation, the method comprising:
   receiving, by a processor from a lens driver, a drive current value representing a current to be provided to a motor to position a camera lens of an electronic device;
   detecting an orientation of the electronic device using a motion sensor;
   determining a gravity vector based upon the orientation; and
   computing, by the processor, an estimated value of a lens position of the camera lens of the electronic device based upon the received drive current value and the determined gravity vector.

2. The method of claim 1, wherein the motion sensor is one or more of an accelerometer, a gyroscope, or a compass.

3. The method of claim 1, wherein the motion sensor is an accelerometer and the gravity vector is calculated using a low-pass filter.

4. The method of claim 1, wherein the computing the estimated value of the lens position includes selecting a drive current offset from a plurality of predefined drive current offsets stored within a look-up table.

5. The method of claim 1, further comprising:
   providing the estimated value of the lens position to an application via an application programming interface.

6. The method of claim 1, further comprising:
   calculating a distance between the electronic device and an object based upon the estimated value of the lens position and a focal length of the camera lens.

7. The method of claim 1, further comprising:
   performing video stabilization based upon the estimated value of the lens position.

8. A non-transitory computer-readable storage medium including program instructions, which when executed by a processor perform a method, the method comprising:
   receiving, by the processor from a lens driver, a drive current value representing a current to be provided to a motor to position a camera lens of an electronic device;
   detecting an orientation of the electronic device using a motion sensor;
   determining a gravity vector based upon the orientation; and
   computing, by the processor, an estimated value of a lens position of the camera lens of the electronic device based upon the received drive current value and the determined gravity vector.

9. The non-transitory computer-readable storage medium of claim 8, wherein the motion sensor is one or more of an accelerometer, a gyroscope, or a compass.

10. The non-transitory computer-readable storage medium of claim 8, wherein the motion sensor is an accelerometer and the gravity vector is calculated using a low-pass filter.

11. The non-transitory computer-readable storage medium of claim 8, wherein the computing the estimated value of the lens position includes selecting a drive current offset from a plurality of predefined drive current offsets stored within a look-up table.

12. The non-transitory computer-readable storage medium of claim 8, the method further comprising:
   providing the estimated value of the lens position to an application via an application programming interface.

13. The non-transitory computer-readable storage medium of claim 8, the method further comprising:
   calculating a distance between the electronic device and an object based upon the estimated value of the lens position and a focal length of the camera lens.

14. The non-transitory computer-readable storage medium of claim 8, the method further comprising:
   performing video stabilization based upon the estimated value of the lens position.

15. An electronic device, comprising:
   a motion sensor configured to detect an orientation of the electronic device;
   a lens driver configured to provide a drive current to a motor; and
   a processor to execute program instructions to perform a method, the method including:
      receiving, by the processor from the lens driver, a drive current value representing the drive current to be provided to the motor to position a camera lens of the electronic device;
      detecting an orientation of the electronic device using the motion sensor;
      determining a gravity vector based upon the orientation; and
      computing, by the processor, an estimated value of a lens position of the camera lens of the electronic device based upon the received drive current value and the determined gravity vector.

16. The electronic device of claim 15, wherein the motion sensor is one or more of an accelerometer, a gyroscope, or a compass.

17. The electronic device of claim 15, wherein the motion sensor is an accelerometer and the gravity vector is calculated using a low-pass filter.

18. The electronic device of claim 15, wherein the computing the estimated value of the lens position includes selecting a drive current offset from a plurality of predefined drive current offsets stored within a look-up table.

19. The electronic device of claim 15, the method further including:
   providing the lens position value to an application via an application programming interface.

20. The electronic device of claim 15, the method further including:
   calculating a distance between the electronic device and an object based upon the estimated value of the lens position and a focal length of the camera lens.

21. The electronic device of claim 15, the method further including:
   performing video stabilization based upon the estimated value of the lens position.

22. The method of claim 1, further comprising driving the motor with the current at the drive current value to position the camera lens of the electronic device.

23. The method of claim 1, wherein the motion sensor is an accelerometer and the determining of the gravity vector includes low pass filtering an output of the accelerometer along a predetermined axis.

24. The method of claim 1, wherein the orientation of the electronic device is detected when the current at the drive current value is provided to the motor to position the camera lens.

25. The method of claim 1, wherein the computing of the estimated value of the lens position occurs after the receiving, detecting and determining steps.

* * * * *